United States Patent [19]

Ostlie

[11] Patent Number: 5,381,741
[45] Date of Patent: Jan. 17, 1995

[54] STACKED COOLING GRATE AND SYSTEM FOR PROVIDING THERMAL POWER FOR A POWER PLANT

[76] Inventor: L. David Ostlie, 19540 Patrick Pl., Corcoran, Minn. 55340

[21] Appl. No.: 236,808

[22] Filed: May 2, 1994

Related U.S. Application Data

[63] Continuation of Ser. No. 16,826, Feb. 12, 1993, abandoned.

[51] Int. Cl.6 .............................................. F23B 7/00
[52] U.S. Cl. .................................... 110/234; 110/235; 110/248; 110/346; 122/232; 122/353; 122/371; 122/374
[58] Field of Search ............ 122/371, 374, 375, 235.25, 122/6 A, 15, 229, 67, 97, 98, 129, 152, 203, 205, 232, 286, 287, 289, 353, 354; 110/234, 235, 248, 233, 349; 126/152 B

[56] References Cited

U.S. PATENT DOCUMENTS

| | | |
|---|---|---|
| 720,867 | 2/1903 | Williams . |
| 1,585,449 | 5/1926 | Welsh . |
| 1,975,601 | 10/1934 | Graafen ............................ 122/376 |
| 2,276,659 | 3/1942 | Kreisinger ....................... 122/371 |
| 2,333,141 | 11/1943 | Barden ............................. 122/374 |
| 3,156,219 | 11/1964 | Zoller .............................. 122/510 |
| 3,822,651 | 7/1974 | Harris et al. ..................... 110/10 |
| 4,195,617 | 4/1980 | Scopetti et al. ............... 122/371 X |
| 4,466,385 | 8/1984 | Waryzasz ......................... 122/510 |
| 4,471,724 | 9/1984 | Pope ............................... 122/13 R |
| 4,480,557 | 11/1984 | Hochmuth ........................ 110/234 |
| 4,502,397 | 3/1985 | Hochmuth ........................ 110/346 |
| 4,516,534 | 5/1985 | Jahier ............................... 122/15 |
| 4,559,882 | 12/1985 | Dobson ............................ 110/254 |
| 4,633,818 | 1/1987 | Horlitz, Jr. et al. ............... 122/4 D |
| 4,640,201 | 2/1987 | Holmes et al. ................... 110/245 |
| 4,651,653 | 3/1987 | Anderson et al. ................ 110/234 |
| 4,664,042 | 5/1987 | Nelson ............................ 110/347 |
| 4,679,511 | 7/1987 | Holmes et al. .................. 110/216 |
| 4,690,076 | 9/1987 | Peletz, Jr. et al. ............... 110/347 |
| 4,700,637 | 10/1987 | McCartney ...................... 110/237 |
| 4,706,645 | 11/1987 | Ostlie ............................. 126/810 R |
| 4,715,301 | 12/1987 | Bianca et al. ................... 110/347 |
| 4,771,708 | 9/1988 | Douglass, Jr. ................... 110/233 |
| 4,779,546 | 10/1988 | Walsh, Jr. ....................... 110/265 |
| 4,784,533 | 11/1988 | Teigen ............................. 406/14 |
| 4,926,797 | 5/1990 | Butler ............................... 122/15 |
| 4,986,347 | 1/1991 | Hirth et al. ...................... 165/94 |
| 5,174,747 | 12/1992 | Massaro, Jr. et al. ............. 432/78 |

FOREIGN PATENT DOCUMENTS

| | | |
|---|---|---|
| 431139 | 12/1938 | Belgium . |
| 0067552 | 12/1982 | European Pat. Off. . |
| 0228255 | 7/1987 | European Pat. Off. . |
| 1216012 | 1/1959 | France . |

OTHER PUBLICATIONS

"Watts Bar Conversion to Whole Tree Energy TM Final Report, vol. I", excerpted pages Jan 30, 1991.
"Whole Tree Energy TM Engineering and Economic Evaluation" Draft Final Report, excerpted pages Dec., 1991.

Primary Examiner—Edward G. Favors
Attorney, Agent, or Firm—Banner, Birch McKie & Beckett

[57] ABSTRACT

A system for providing thermal power to an electrical power plant wherein substantially whole trees are supplied as fuel without being processed into small woodchips or chunks. A stacked cooling grate suspends the substantially whole trees within the combustion chamber. The cooling grate is formed by stacking an upper tube and at least one lower tube vertically beneath the upper tube. The tubes of the cooling grate are supplied with water to cool the grate.

19 Claims, 13 Drawing Sheets

STACKED COOLING GRATE AND SYSTEM FOR PROVIDING THERMAL POWER FOR A POWER PLANT

This application is a continuation of application Ser. No. 08/016,826, filed Feb. 12, 1993 abandoned.

TECHNICAL FIELD

The present invention relates to a system for providing thermal power to generate electricity in a power plant, and to a high pressure, water cooled stacked tube cooling grate that suspends the fuel in the combustion chamber.

BACKGROUND OF THE INVENTION

Presently the most cost effective power generation alternative for meeting our future electrical energy needs is the coal burning power plant. Nuclear power is not thought to be a cost effective alternative for the near future because of the high cost of construction. Additionally, hydro power is also not available for development in many areas of the country in significant amounts, and the cost of oil and gas fuels for electrical power generation have risen beyond competitive cost levels typical of base loaded generation. Thus, coal burning power plants have become the staple for electric generation, in spite of the high cost of pollution abatement.

A wood burning power plant is an environmentally and cost beneficial alternative technology. Growing trees for fuel is the purest and cleanest form of capturing and storing solar energy. Also, the source is domestic and 100% renewable. The largest power application using wood fuel in the United States is at the generating plant in Burlington, Vt.

However, the conventional wood burning power plant uses wood fuel processed to woodchips, shreds, pellets, dusts, powder and other forms. Because of the cost of processing trees into appropriate forms for the power plant, conventional wood burning electric generation cannot be competitive with other alternative energy sources for power generation such as coal, hydro and nuclear. Furthermore, such processed wood burns rapidly, frequently in suspension as it is injected into the furnace above the grates. In order to keep a constant and steady source of heat supplied to the boiler of the power plant, the processed wood must be supplied to the furnace at a precisely controlled rate.

One solution to the wood burning alternative is presented in Ostlie, U.S. Pat. No. 4,706,645 which is hereby incorporated by reference. There, substantially whole trees are relied upon as the fuel source. While reducing the costs associated with processing trees into appropriate forms for the power plant, the problem of supporting the substantially whole trees in the combustion chamber arises. Grates that support the trees in the furnace must be cooled to protect them from damage due to the high temperatures in the furnace. Water cooled grates for furnaces used to suspend solid fuel are typically made by casting, and are continually moving or traveling in the furnace. These grates were typically designed to support about six inches of solid fuel, and do not possess the strength to support a deep bed of whole trees nor can they accommodate the high pressures and flows typical of large steam generator furnaces.

SUMMARY OF THE INVENTION

The present invention provides a high pressure, water cooled stacked tube cooling grate for suspending substantially whole trees in the electrical generating plant. The grate is interposed in a system which generates electricity by using substantially whole trees as fuel in place of conventional processed wood, thus eliminating the need to process the wood to small and uniform pieces or particles.

The present invention provides a system for providing thermal power to an electrical generating power plant which comprises a combustion chamber; drying buildings located adjacent to the power plant and equipped with waste heat driers for storing and drying substantially whole trees prior to combustion to reduce the moisture content of the stored trees; a charge pit located adjacent the combustion chamber; at least one conveyor for transporting the whole trees from the drying building to the charge pit; a ram feeder for feeding the whole trees from the charge pit into a combustion stage of the combustion chamber; a stacked cooling grate for supporting the trees in the combustion chamber; air inlets located above and below the grate for supplying air to the combustion chamber; and at least one boiler tubes or water walls located above or above and at the combustion area in the combustion chamber for absorbing the heat of combustion of trees.

The stacked cooling grate comprises a first tube bank or water wall, extending vertically downwardly, a second tube bank or water wall extending vertically downwardly, the first and second tube banks forming a plurality of water cooled beams connecting the first and second tube banks in fluid communication. The substantially whole trees are suspended on the plurality of water cooled beams.

The water cooled beams consist of tubes from the first and second tube banks which extend into the combustion area. Additionally, the tubes from the tube banks are arranged into stacks or bundles of, for example three, vertically aligned tubes. Each stack of tubes forms a cooled support beam. Between each support beam or stack of tubes are gaps through which ash and char fall. These support beams provide the necessary structural strength to the grate to safely support the substantial weight of the trees.

Further objects, features and other aspects of this invention will be understood from the following detailed description of various embodiments of this invention referring to the annexed drawings.

DETAILED DESCRIPTION OF THE INVENTION

Figure 1:
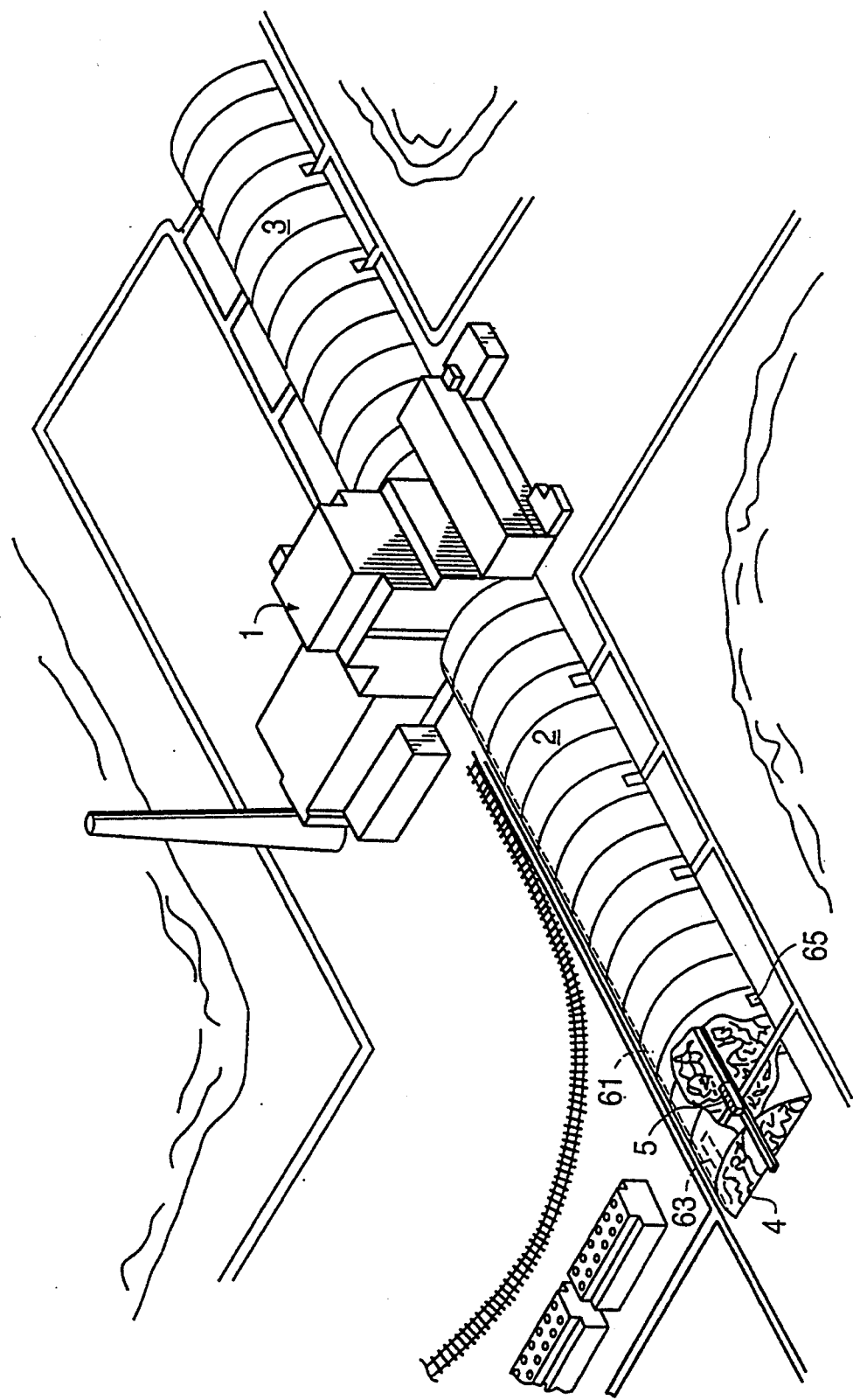
FIG. 1 is a schematic drawing of an external appearance of one embodiment of a power plant using the present invention, partially broken away to indicate an internal view of a drying building.

Referring now to FIG. 1, an external appearance of one preferred embodiment of a power plant using a substantially whole tree burning system in accordance with the present invention is shown. The terms "substantially whole trees", "whole trees", or simply "trees", when used in reference to the combustion fuel used in the power plant, are used herein to differentiate the fuel from typical wood fuel that has been processed quite extensively to dust, shreds, chips, pellets, powders and the like, and means that the wood is used in the form substantially as it was cut in the forest. The terms, of course, include wood that has been delimbed or slightly load trimmed for purposes of transport; has been broken during transport to the plant or during delivery to the furnace; or has undergone minor sectioning, such as into halves or thirds.

Typically, the trees could be relatively large, for example, an average of three hundred pounds or greater and greater than forty feet long. Trees with relatively large diameters, for example, six inches or greater are preferred. Such larger trees can burn in a manner to provide relatively steady and slow gasification or volatilization, i.e., gases which are given off by the trees during burning. These gases are subsequently burned in the combustion chamber in an area above the burning trees, in what may be considered a second combustion stage. The gases burn at a higher temperature than the average temperature of the pile of trees.

Controlling the gasification or volatilization and subsequent combustion of the gases is an element of controlling the burning of trees according to the present method. When a substantially whole tree is burned, a dark char layer develops on the outside surface of the tree. Any unburnt portion on the inside of the tree is called "white wood". The white wood portion of the tree generally retains moisture to some degree, and that moisture along with other hydrocarbon material is eventually gasified or volatilized as more of the tree burns. When burning is not regulated and an unlimited supply of oxygen is available to a burning tree, the tree would tend to burn rapidly and any moisture and other hydrocarbon material in the white wood is quickly volatilized. As soon as the gases are released, combustion of those gases occurs almost immediately, at the surface of the wood since oxygen is available for that combustion. Thus, when oxygen is readily available to the burning tree, volatilized gases burn quickly after being released from the tree, and any benefits from making use of the volatilized gases in a second combustion stage are not realized. In the present method, however, the oxygen supply to the combustion chamber is controlled in a manner which inhibits the volatilized gases from burning up completely in the first combustion stage. Thus, the volatilized gases exiting the pile and entering the second combustion stage are also burned in a controlled manner. The separation of combustion into two stages allows the final combustion to take place in gaseous form without solid particle masking, thus allowing very efficient gas combustion with low excess air, much like natural gas firing. The rate of volatilization is dependent upon many parameters, some of them being the moisture content of the trees, the temperature of the burning trees, and the size of the trees. Generally, larger trees, greater than four inches in diameter, are preferred since the burning can be more readily controlled due to their larger proportion of white wood during burning, i.e., they do not burn as rapidly. Any type of tree or mix of a variety of different trees are believed suitable for use in the present method. Scrub trees and forest cull wood could be used. However, green conifers or evergreens would be less desirable because of the handling problems associated with dry needles.

A power plant can be designed to have almost any generating capacity, including the 400 Megawatt plant described herein. A power plant larger than 10 Megawatts is economically preferable for a whole tree burning system.

Power plant building 1 located in the center includes a furnace, a boiler and other equipment to feed whole trees to the furnace which will be explained hereinafter. Power plant building 1 also includes a conventional electric generator which converts thermal power into electricity, e.g., generating steam to drive a turbine.

Drying buildings 2 and 3 are located symmetrically on both sides of and adjacent to power plant building 1. Whole trees 4 carded to the plant for fuel are stored in drying buildings 2 and 3, substantially as cut and transported from the forest, for the purpose of reducing moisture contained in the whole trees to make them appropriate for combustion.

Drying buildings 2 and 3 are equipped with dryers, which supply dry atmospheric air to drying buildings 2 and 3. The dry air can be heated, and introduced into the drying buildings in any number of ways. The air may be heated by making use of waste heat from the furnace/boiler system and/or exhaust gases. Because heat exchange systems in a typical power plant cannot convert all the thermal energy created by the furnace/boiler system into electricity, the unconverted remaining thermal energy can be used in part for drying the trees. When using waste heat from the furnace boiler system, the dryers are supplied with warm water typically from 80° F. to 140° F. using any waste heat from power plant building 1. For example, through piping shown diagrammatically as dash line 61 in FIG. 1. The dryers include a plurality of fans, one of which is shown as 63, along one side of the base of the drying buildings. Fans 63 draw outside air into the buildings and pass the air over heat exchangers along piping 61, thereby heating the air. The heated air passes transversely across the buildings and through the stored trees, and exits through openings 65, one of which is shown in building 2, along the opposite base of buildings 2 and 3. Another way of heating the dry air would be to use exhaust gases. Since most systems do not use exhaust gases below about 300° F. due to the acid concentrations of the gas when firing fossil fuels, such gases are considered to be waste heat and could be used for drying. The actual placement of any heat exchangers for heating the air could be varied depending on plant layout, and economical considerations. One example was explained above with reference to FIG. 1. Another option may be to place a large heat exchanger in the generator building and introduce the heated air by blowing it into the drying building. Any of the above-mentioned methods of supplying drying air to the drying buildings can be used alone or in combination with other methods. The invention is not limited to any specific air heating method or delivery system.

Typically, in this embodiment, whole trees 4 are stored for 30 days in drying buildings 2 and 3. The heated air preferably passes through a pile of stored trees from the bottom upward, gathering moisture from the trees as it travels up. Since the relative humidity of the drying buildings themselves will be affected by many factors, the drying that takes place can best be described by contrasting the relative humidity in the heated air entering a pile of stored trees with the relative humidity of the air as it exits the pile of trees. Preferably the dry, heated air provided at the bottom of the pile has a relative humidity of less than 2%, and is preferably about 130° F. The heated air as it travels upward through the pile of trees gathers moisture and is cooled so that the air exiting the pile of trees at the top has a relative humidity of about 70% with a temperature of about 76° F. The relative humidity in the middle of a pile of drying trees is preferably about 35%. In a 400 Megawatt power plant each drying building could be 3000 feet in length with a storage area of approximately 5 acres.

Conveyor 5 is installed within drying buildings 2 and 3, and extends into the area of the furnace in power plant building 1. Conveyor 5 conveys whole trees 4 from outside into a proper location in the drying building for storage or from the drying buildings to the furnace area in power plant building 1 for supplying the trees to the furnace.

The whole trees are not processed into wood chips, shreds, pellets, dusts, powder or other forms as used in a conventional wood burning power plant. The whole trees are, substantially as they are delivered, fed into the furnace as fuel. The wood fuel in the present invention contains substantially whole trees, preferably with an average individual weight greater than about 300 pounds.

Figure 2:
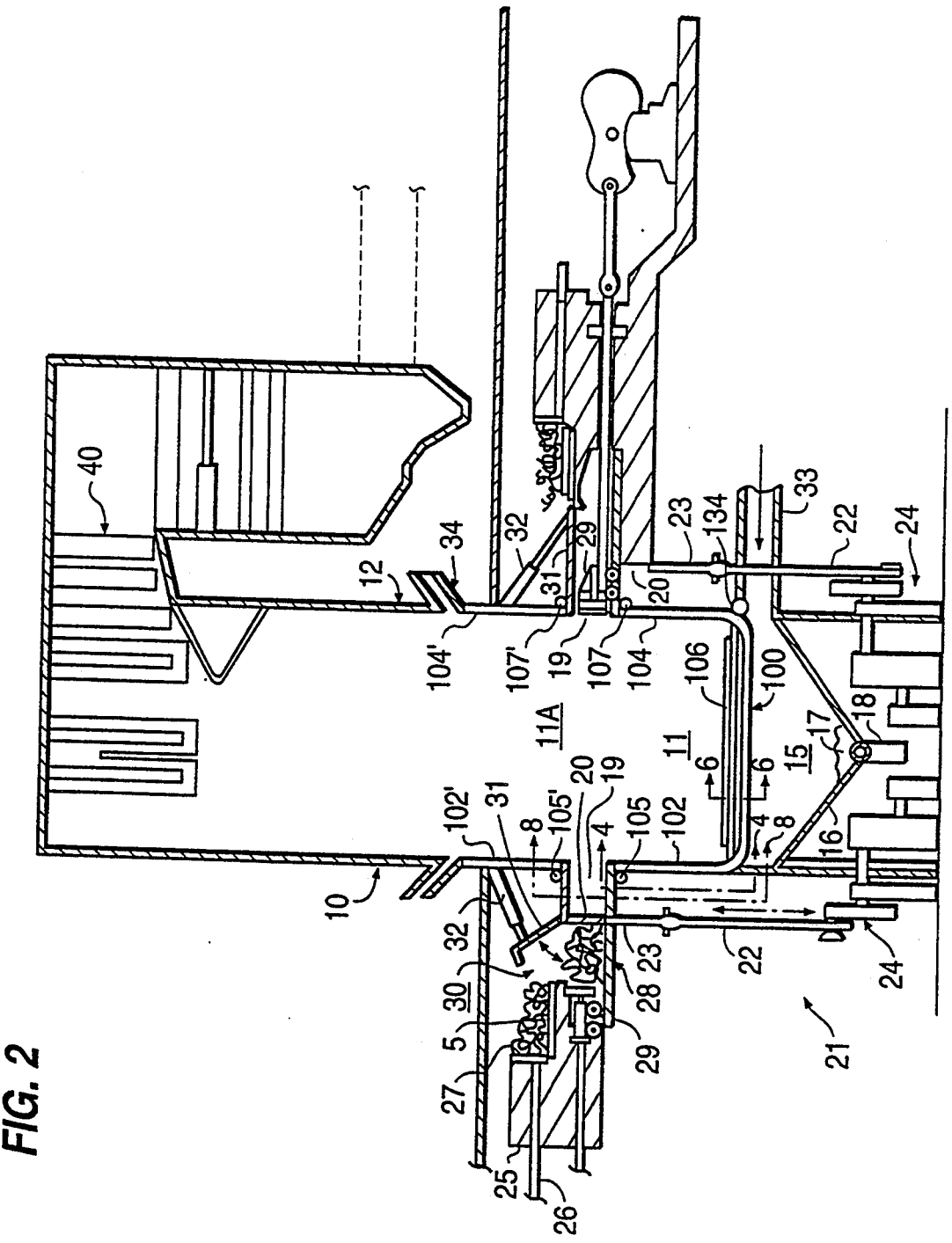
FIG. 2 is a cross-sectional drawing of a furnace, a boiler and fuel delivery equipment according to the first preferred embodiment.

Referring to FIG. 2, which indicates a furnace/boiler system according to a first preferred embodiment of the present invention, a combustion chamber 10 can be said to have three combustion areas, or three combustion stages. The first combustion stage is burning and volatilizing the wood. The initial combustion stage takes place in the combustion area 11 formed by furnace wall 12, lined in a conventional manner and a horizontal wood support structure, preferably a stacked cooling grate 100. According to the first preferred embodiment, stacked cooling grate 100 has a plurality of horizontal water cooled stacked beam supports 106, only one of which is shown in FIG. 2.

In operation, substantially whole trees 4 are fed onto grate 100 to form a bed of combustion material burned in the initial combustion area or stage 11. The burning of the bed of trees volatilizes gases in the trees which are subsequently burned above the bed of trees, in what can be considered to be a second combustion area or stage 11A, at a higher temperature than the average temperature of the bunting trees. The stacked cooling grate 100, whose construction is discussed in detail below, has gaps between adjacent beams 106. Char created by combustion of whole trees in initial combustion stage 11 falls through the gaps in grate 100 into a third combustion area or stage 15. Second combustion stage 15 is formed by a portion of furnace wall 12 and a downwardly sloped bottom wall 16. A central opening 17 at the center of bottom wall 16 is connected with an ash discharge 18. Char and ash that fall through the gaps between adjacent beams 106 burn in third combustion stage 15, and unburned ash is collected at the center of bottom wall 16. Ash is then taken to the outside of the furnace through central opening 17 and ash discharge 18 for disposal.

The wood burning first combustion stage 11 results in the second combustion stage 11A in which volatilized gases from the wood are burned in what may be termed a volatile combustion stage. The wood burning also results in the third combustion stage 15 in which char produced from the burning wood falls through gaps in the stacked cooling grate 100 to subsequently burn as the third combustion stage. The second combustion stage is also called the "over fire" area, and the third combustion stage is also called the "under fire" area.

An under fire or primary air inlet 33 is installed in furnace wall 12 of third combustion stage 15 beneath stacked cooling grate 100 of initial combustion stage 11. Air at approximately 700° F., during typical operation, is supplied in the horizontal direction through the air inlet 33. The air supplied through inlet 33 controls the temperature at which the bed of trees 4 supported on grate 100 burns. By raising or lowering the flow rate, and/or secondarily the temperature of the air, the combustion rate of the bed of trees 4 can be raised or lowered. The bed of trees 4 is at least three feet high above the bottom of grate 100, and preferably at least twelve feet high, depending on the power rating of the plant. A pair of over fire or secondary air inlets 34 are also installed symmetrically in furnace wall 12 above initial combustion stage 11. Air controlled up to approximately 700° F., during typical operation, is supplied into initial combustion stage 11 in a movable downwardly slanted direction so that air is effectively mixed with other gases and supplied to the area above the wood bed to control the temperature at which the released gases burn, that is, the temperature at which the second combustion stage occurs. The flow rate and temperature of the air supplied through inlets 33 and 34 is controlled in a conventional manner. Preferably the temperature of burning fuel in initial combustion stage 11 is around 2200° F. and the temperature of the burning gases in second combustion stage 11A is preferably around 2700° F.

A pair of tree charge or injection openings 19 are symmetrically formed in furnace wall 12 at the area of initial combustion stage 11 to feed substantially whole trees into the furnace. Each tree charge opening 19 has a gate 20 which opens and closes tree charge opening 19. The motion of gate 20 is operated by a gate lifter 21, which comprises, respectively, crank 22 and rod 23 which in turn are connected to drive means 24. As drive means 24 are actuated, gate lifters 21 move gates 20 upward and downward.

Substantially whole trees are carried by drag conveyors 5 from drying buildings 2 and 3 to the furnace in the vicinity of each of tree charge openings 19. Conveyor 5 brings whole trees 4 to the furnace at a level higher than tree charge opening 19. A charge pit feeder 25 removes whole trees from drag conveyor 5. Charge pit feeder 25 has an extendable rod 26 and a plate portion 27 by which whole trees on conveyor 5 are pushed in the horizontal direction transverse to the moving direction of conveyor 5 so that whole trees drop off the conveyor, into a charge pit 28 formed adjacent to tree charge opening 19. A charge pit 28 is located on each of two opposite sides of the furnace. One side of charge pit 28 is defined by gate 20 and the other side is defined by a terminal plate of a ram feeder 29. The upper opening of charge pit 28 is a tree delivery inlet 30 which has a lid 31. Lid 31 is rotatably supported by a horizontally extended portion of furnace wall 12 defining tree charge opening 19. Tree delivery inlet 30 is opened or closed by an operating actuator 32 attached to lid 31.

When whole trees 4 are fed into charge pit 28 from conveyor 5, tree delivery inlet 30 is open but gate 20 is closed and ram feeder 29 is at the most recessed position from tree charge opening 19. After charge pit 28 is filled with substantially whole trees 4, tree delivery inlet 30 is closed, gate 20 is opened and ram feeder 29 is actuated to push the whole trees from charge pit 28 into initial combustion stage 11 through tree charge opening 19. Thus, whole trees are delivered in batches from charge pit 28 to the furnace.

Whole trees 4 are supplied into the furnace alternately from a tree charge opening on each side of the furnace so that the whole area of initial combustion stage 11 is evenly used for combustion. Any conventional mechanism can be used to initiate the combustion of the trees. Also, once combustion has started, the already burning trees function as the mechanism for initiating the combustion of trees subsequently fed into the furnace.

Boiler sections 40 are installed above combustion chamber 10 so that the thermal energy created by the combustion of the substantially whole trees, and particularly the combustion of the gases produced during volatilization or gasification of the trees, efficiently produces steam. Steam thus produced is led to power generators, not shown in FIG. 2. Power generators convert thermal energy of steam into electrical energy. Details of boiler sections and power generators are known in the prior art and not described here. Other systems of converting thermal energy to electrical energy could also be used.

Figure 3:
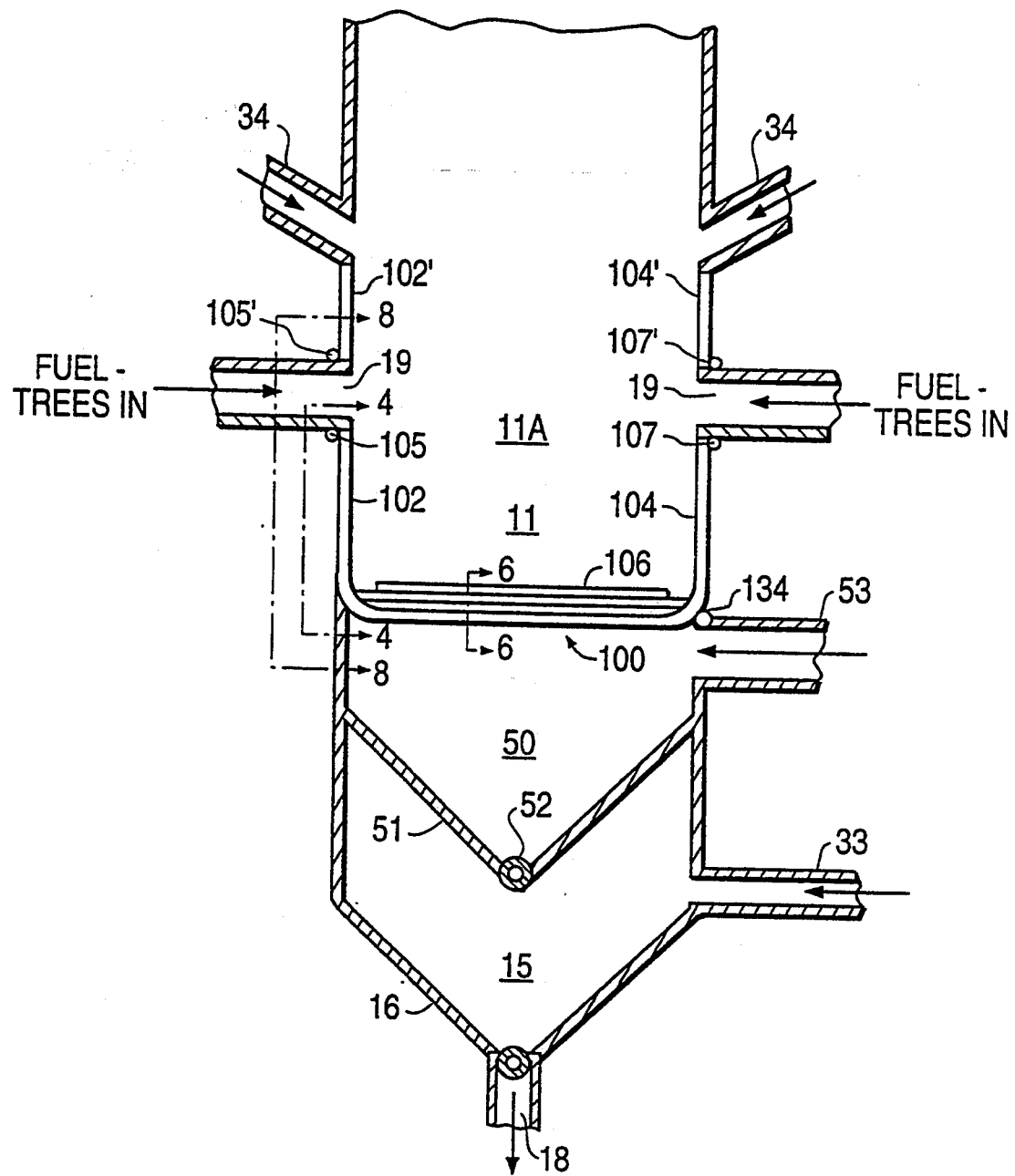
FIG. 3 is a schematic drawing illustrating a combustion chamber according to a second preferred embodiment.

Although the embodiment shown in FIG. 2 has three combustion stages, i.e., the initial wood burning combustion stage 11, second volatile combustion stage 11A, and third combustion stage 15, it is possible to have multiple combustion stages. FIG. 3 illustrates the conceptual relationship of four combustion stages, according to the second preferred embodiment of the invention. Intermediate or fourth combustion stage 50 is added between initial combustion stage 11 and third combustion stage 15. Intermediate combustion stage 50 is surrounded by furnace wall 12 and has a downwardly sloped grate 51 with a central opening 52. Air inlet 53 is also provided in furnace wall 12 horizontally to supply air in intermediate combustion stage 50.

In the four-stage combustion chamber design, the gaps between adjacent beams 106 are sufficiently large to allow char created from combustion of substantially whole trees to fall into intermediate combustion stage 50. In intermediate combustion stage 50, char is burned and thus creates smaller char and ash particles which fall through grate 51 and its central opening 52 into combustion stage 15 where these are completely burned into ashes.

Preferable temperatures of burning fuels in each of the stages are approximately 2000° F. to 2400° F. in initial combustion stage 11, 1500° F. in intermediate stage 50 and 650° F. to 900° F. in combustion stage 15. Burning gases in combustion stage 11A above initial combustion stage 11 occurs at approximately 2400° F. to 2800° F.

With such high combustion temperatures, the grate 100 which supports the trees in the first combustion stage 11 must be cooled to protect it from damage due to the high temperatures. Since the present invention circulates feedwater from the boiler which is at saturation temperature and full pressure, the stacked cooling grate must be able to withstand high pressures. The feedwater in the stacked cooling grate 100 would be at about 680° F. and 2520 psi pressure. These parameters allow for a favorable temperature balance between the combustion air which is about 650° F. to 700° F. on the cooling grate and the temperature of the water in the grate, 680° F.

Reference is again had to the stacked cooling grate 100 in FIGS. 2 and 3. The stacked cooling grate 100 is integral with two vertically extending water walls 102, 104 disposed on opposite sides of the furnace wall 12 in the initial combustion stage 11. Water wall 102 forms a first bank of tubes arranged in substantially a first plane while water wall 104 forms a second bank of tubes arranged in substantially a second plane. Water walls 102, 104 are formed by a plurality of welded tubes, only two of which are shown in FIGS. 2 and 3, thereby forming a diaphragm water wall 102, 104. Water walls 102, 104 are connected to header pipes 105 and 107 respectively located below each tree charge opening 19. A substantially horizontal water cooled stacked beam support 106 supports the fuel charge. The beam support 106 is formed by bending the tubes of water walls 102, 104 (for example, ninety degrees) as viewed in FIGS. 2 and 3. Consequently, beam support 106 provides fluid communication between respective tubes in water walls 102, 104. The upper portions of the furnace interior can also be lined with corresponding water walls 102' and 104' above the tree charge openings.

Figure 4:
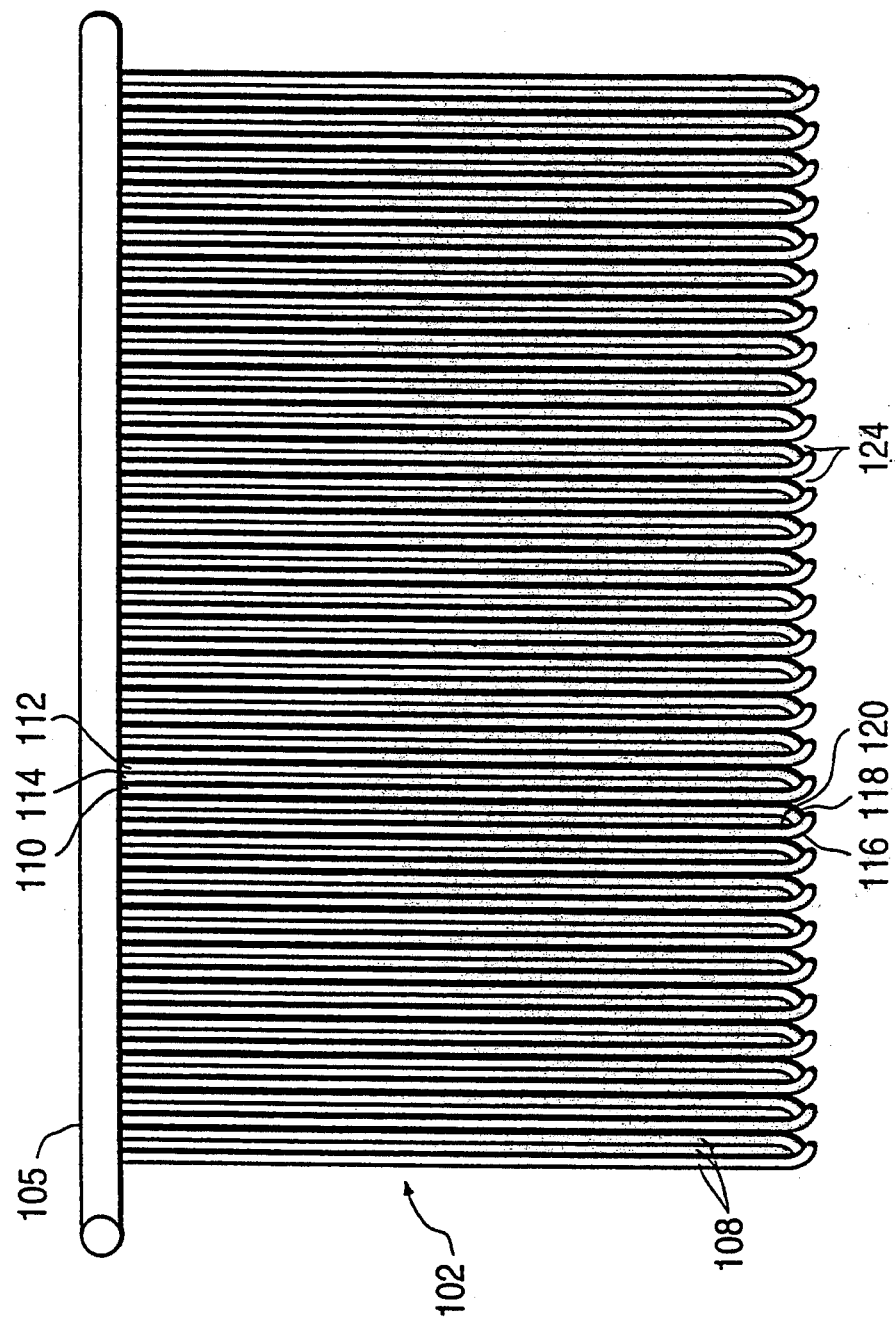
FIG. 4 is a side elevational view of a tube bank or water wall taken along view 4—4 in FIGS. 2 and 3.

With reference to FIG. 4, there is shown an end elevational view of one of the water walls 102 as seen in the direction of 4—4 in FIG. 2 and 3. It will be understood that the other water wall 104 can be of identical construction, so explanation thereof is omitted. Water wall 102 consists of a plurality of vertically extending water filled tubes 108. Tubes 108 are preferably welded together such that they form a diaphragm water wall.

That is, water wall 102 consists of a continuous array of water fried tubes 108 arranged in substantially the same plane. Tubes 108 are about 2–4 inches in diameter, preferably three inches in diameter.

Tubes 108 are welded together in preferably one of two ways. First, all of the tubes 108 can be welded directly to their adjacent tubes. This construction leaves no gaps between adjacent tubes. Alternatively, each tube 108 may have a separator plate (not shown), or some other spacing element, welded to each tube 108. Under this configuration, adjacent separator plates are welded together. Consequently, each tube 108 is spaced from adjacent tubes in dependence on the size of the separator plates.

Tubes 108 preferably extend vertically downwardly from header pipe 105. However, it is within the purview of the preferred embodiments to have one or both water walls angled inwardly towards the initial combustion stage 11. Moreover, tubes 108 are preferably aligned in substantially the same plane; however, tubes 108 can also be staggered within the tube bank. Under the preferred embodiments, the water walls 102, 104 are preferably parallel to one another and perpendicular to the beam supports 106.

Figure 5:
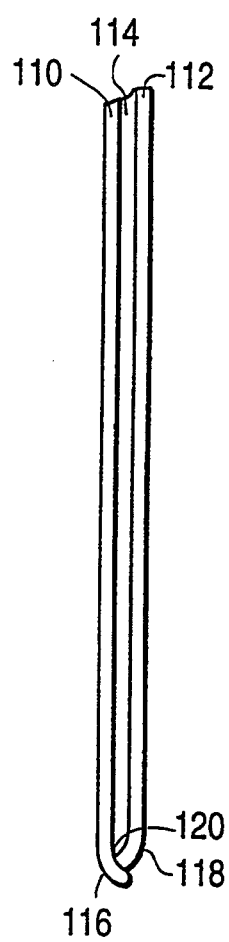
FIG. 5 is a detailed view of three tubes in the tube bank of FIG. 4.

With reference to FIG. 5 in conjunction with FIG. 4, there is shown a three tube bundle 110, 112, 114 comprising a portion of the diaphragm water wall 102. Each of tubes 110, 112, 114 are formed with 90° bends 116, 118, 120. The middle tube 114 of the bundle has a true 90° bend while tubes 110, 112 are additionally bent towards and vertically beneath the middle tube 114. Each tube 110, 112, 114 is of a different length as it extends down from the header pipe 105. For example, in FIG. 5, tube 114 is the shortest as it is positioned at the top of the beam support 106. Tube 112, on the other hand, is bent to lie directly beneath tube 114. Accordingly, tube 112 is longer than tube 114 as it vertically extends down from header pipe 105. Tube 110 extends beneath tube 114, and consequently has the longest vertical dimension of the tubes.

It will be readily apparent to one skilled in the art that the order of the stack of tubes 110, 112, 114, i.e., which of the tubes retains the top, middle or bottom positions in the beam support 106, can be varied from that depicted in FIGS. 4 and 5. For example, tube 110 could be positioned as the upper tube in beam support 106 with tubes 114 and 112 retaining the middle and lower positions, respectively. Moreover, the beam support 106 could be manufactured in bundles of two or more tubes as long as sufficient strength is afforded by the beam support. The three tube bundle 110, 112, 114 comprising beam support 106 serves only as an illustrative example.

Figure 6:
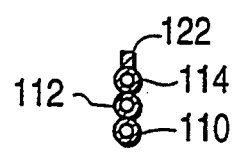
FIG. 6 is a cross-sectional view of a single bundle of tubes in the water cooled support beam taken along Section 6—6 in FIGS. 2 and 3.

FIG. 6 depicts a cross-section of the three tube bundle 110, 112, 114 taken along section 6—6 in FIGS. 2 and 3. A wear bar 122 is preferably welded to the upper tube 114 in the three tube bundle. Wear bar 122 protects tube 114 from damage which could otherwise result from supporting the substantially whole trees, and provides an extra degree of rigidity to the bundle of stacked tubes 110, 112, 114. Each tube bundle 110, 112, 114 forms a single horizontal water cooled stacked beam support 106. A plurality of beam supports 106 forms the grate which suspends the fuel charge within the initial combustion stage 11 while bridging the fluid communication between corresponding tubes 108 in the first tube bank 102 and the second tube bank 104.

Figure 7:
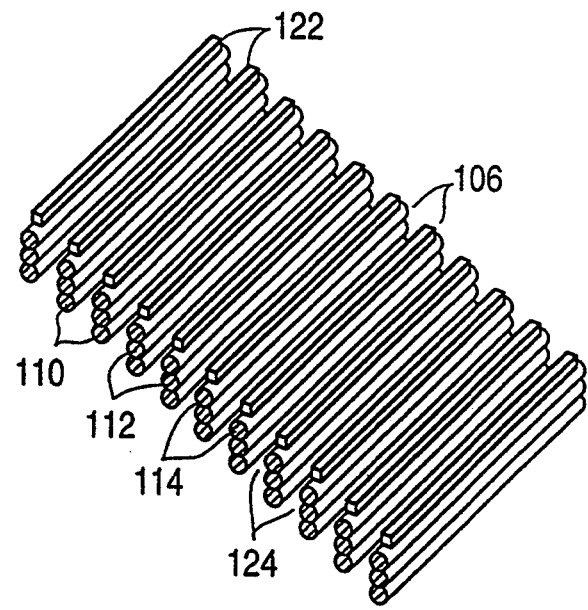
FIG. 7 is a perspective view of a plurality of water cooled beam supports.

FIG. 7 depicts a top perspective view of a plurality of beam supports 106 formed by bundles of vertically aligned tubes 110, 112, 114. Gaps 124 are formed between each bundle of tubes 110, 112, 114. Ash and char created in the combustion of the trees falls through gaps 124. It will be appreciated by those skilled in the art that a beam support 106 consisting of a plurality of vertically aligned water cooled tubes, e.g., three tubes deep in FIGS. 2–7, increases the strength of the stacked cooling grate over a beam support being only one tube deep. The number of tubes used to form a beam support will depend on variables such as the size of the furnace, the sizes of the tubes used, the expected load the beam support will be expected to support, etc.

According to the preferred embodiments, the outside diameters of all of the tubes forming the diaphragm water wall 102 are substantially equal, and the tubes in the diaphragm water wall 102 are welded directly to each other without spaces therebetween. Under such a configuration, the gap 124 between adjacent beam supports 106 would be equal to at least twice the outside diameter of the tubes 110, 112, 114. It will be understood that when the tubes 108 in the water wall are all of the same outside diameter and have no spaces therebetween, the gap 124 between adjacent beams 106 is equal to the sum of the outside diameters of the tubes disposed beneath the upper robe 114. However, the gap 124 can be altered in a number of ways including, but not limited to, providing a separator plate for each robe in the diaphragm water wall 102, using different outside diameters for each separate robe in bundle 110, 112, 114, staggering the tubes 108 along header pipe 105, or a combination of all three.

Figure 8:
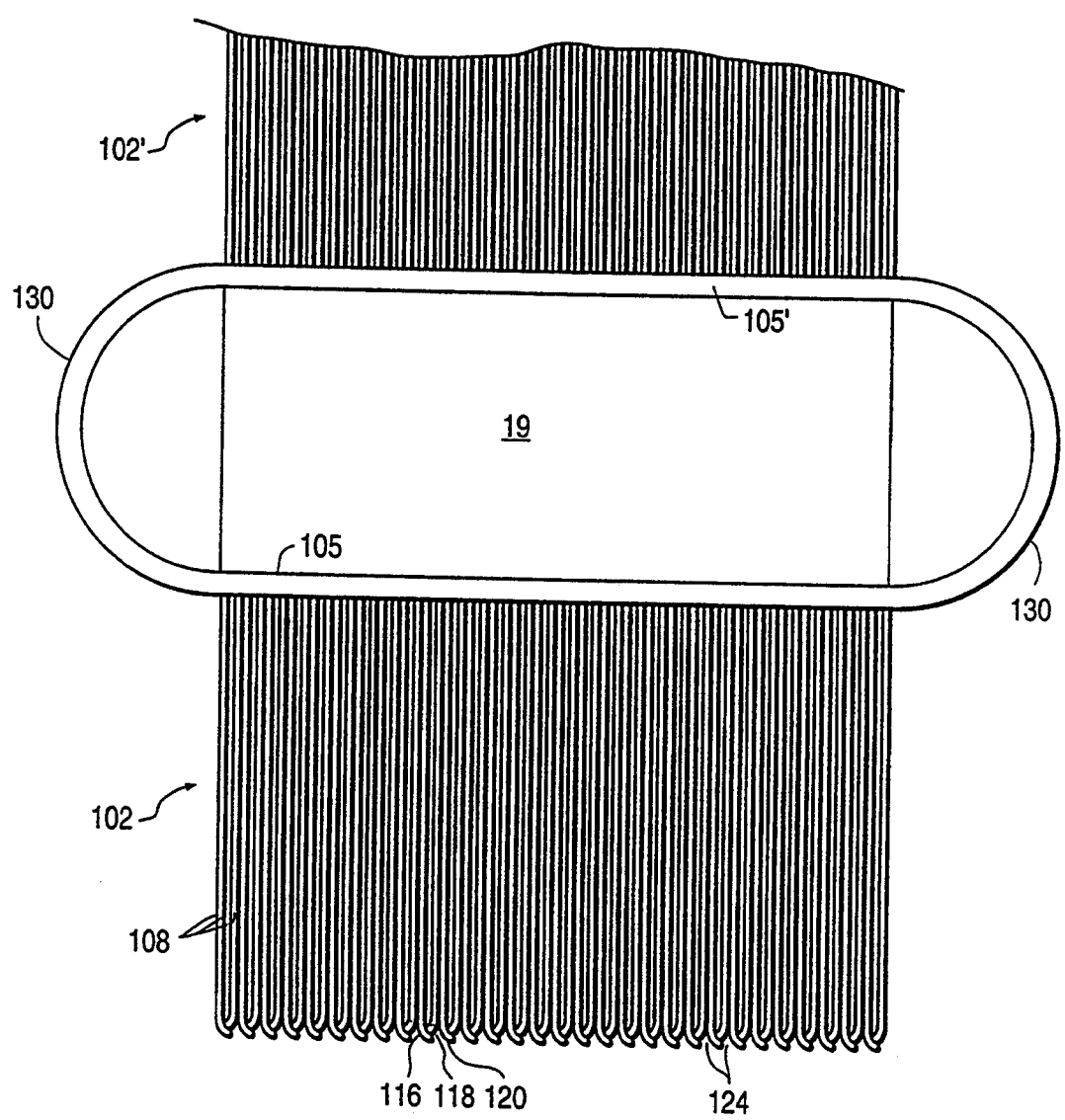
FIG. 8 is a side elevational view of a tube bank and injection opening taken along line 8—8 in FIGS. 2 and 3.

The relationship between the header pipe 105 and the water wall 102 is seen in FIG. 8. The water wall 102 which is located under the charge opening 19 is connected to header pipe 105 along the top, directly under the charge opening. The header pipe 105 is connected to an upper header pipe 105' located above the charge opening 19 by ring header tie 130. The tie 130 is shown schematically in FIG. 8, and extends outside of the combustion chamber. The upper header pipe 105' may be connected to an upper water wall 102' which continues upward on the furnace wall. In this way, the lower water wall 102 and upper water wall 102' are in fluid communication. It will be understood that connections between headers and water walls described hereinafter are achieved in similar ways.

Figure 9:
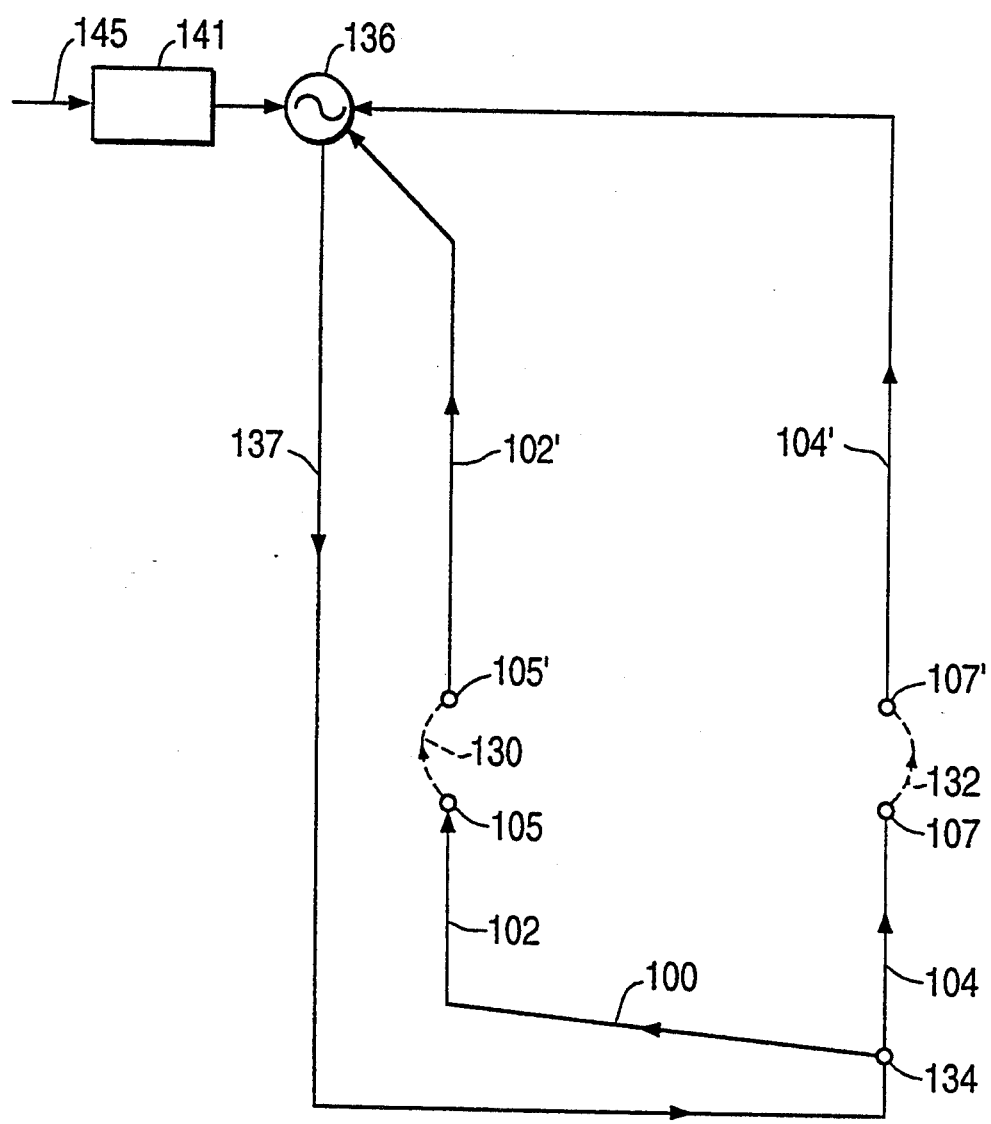
FIG. 9 is a water circuit diagram of the circulation of water in the furnace, boiler and fuel delivery equipment of FIGS. 2 and 3.

FIG. 9 is a simplified water circuit diagram of the water flow used to cool the stacked cooling grate. The arrows indicate the direction of water flow. A drum 136 contains water and steam from the boiler, and receives feedwater from an economizer 141. Lines labeled 145 designate pipes which carry feedwater. The drum 136 is connected to a down comer pipe 137 through which the water enters the circuit. The water first enters a header 134 which is also known as a mud drum. The mud drum 134 receives water from down comer pipe 137, and the water leaves the mud drum 134 through the tubes of beam support 106 of grate 100 and to the robes of water wall 102, thereby cooling the stacked grate. Water also leaves mud drum 134 through the robes of water wall 104 toward injection header 107. In this fashion, the water walls 102 and 104 are in fluid communication with each other. The water then travels upward through each of the water walls 102 and 104, through the injection headers 105 and 107 and through the ring header ties 130 and 132 respectively. The water makes its way through the tubes of upper water walls 102' and 104' and back to the drum 136. The water circuit of FIG. 9 shows that the stacked cooling grate 100 is an integral part of the furnace/boiler water circuit. The water circuit for the embodiment shown in FIG. 3 would be similar to the diagram illustrated in FIG. 9.

Figure 10:
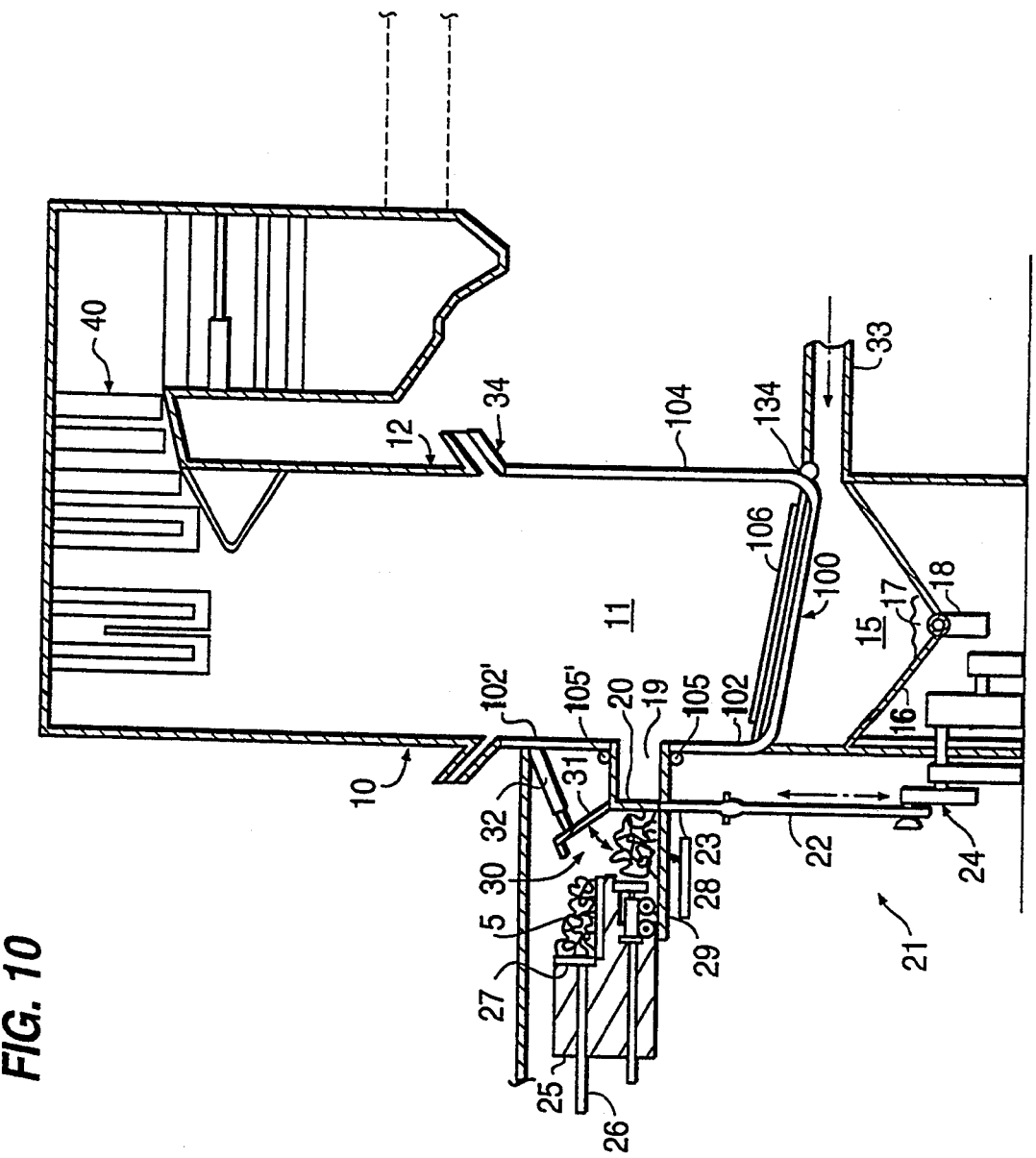
FIG. 10 is a cross-sectional drawing of a furnace, a boiler and fuel delivery equipment in a power plant according to a third preferred embodiment.

FIG. 10 shows a third preferred embodiment of the whole tree burning system. Elements that are similar to those in FIGS. 2 and 3 have been designated with the same numerals, and discussion will be reserved for those features that differ from the previous embodiments. This third preferred embodiment differs from the preferred embodiments shown in FIGS. 2 and 3 in that the substantially uncut trees are fed into the initial combustion stage 11 from only one side (to the left in FIG. 8). To compensate for the one-sided feeding of the trees, the stacked cooling grate 100 is modified to have a slight downward slope away from the fuel charge opening 19.

The sloped cooling grate 100 according to this preferred embodiment has the added advantage of forming a constant depth bed of trees. A constant depth of trees is desirable for generating volatilized gases evenly throughout the pile while preventing oxygen breakthrough which would cause the gases to burn too quickly and discourage the formation of volatilized gases in the second combustion stage. Accordingly, a more uniform heat distribution can be achieved across the fuel bed. The slope of the grate according to this preferred embodiment is on the order of about 8 to 22 degrees, preferably 15 degrees. The slope of the grate 100 will depend upon various factors including the species, class, age, size distribution, etc. of the trees. Accordingly, the slope of grate 100 is a design variable of the site at which the plant will be constructed.

Figure 11:
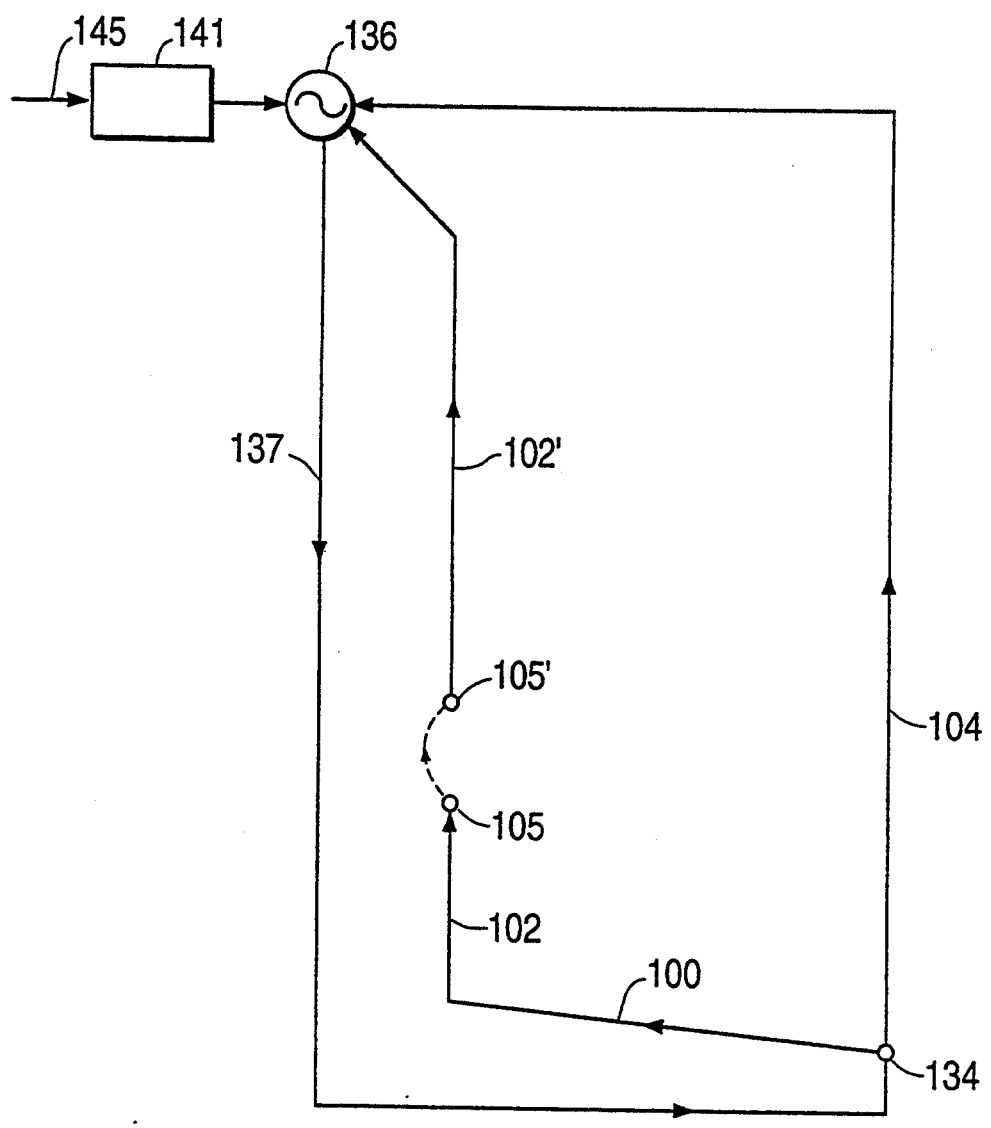
FIG. 11 is a water circuit diagram of the circulation of water in the furnace, boiler and fuel delivery equipment of FIG. 10.

FIG. 11 is a simplified water circuit diagram similar to that of FIG. 9. The major distinction of the third preferred embodiment is the absence of one of the injection headers since only one charge opening is present. The injection header 105 remains at the bottom of the charge opening 19. The water leaves mud drum 134 identically as in FIG. 9, but water wall 104 is continuous and does not have a lower and upper portion, since there is no charge opening on that side of the furnace. Only water wall 102 is connected to the injection header 105, the ring header tie 130 and the upper injection header 105' to an upper water wall 102'.

Figure 12:
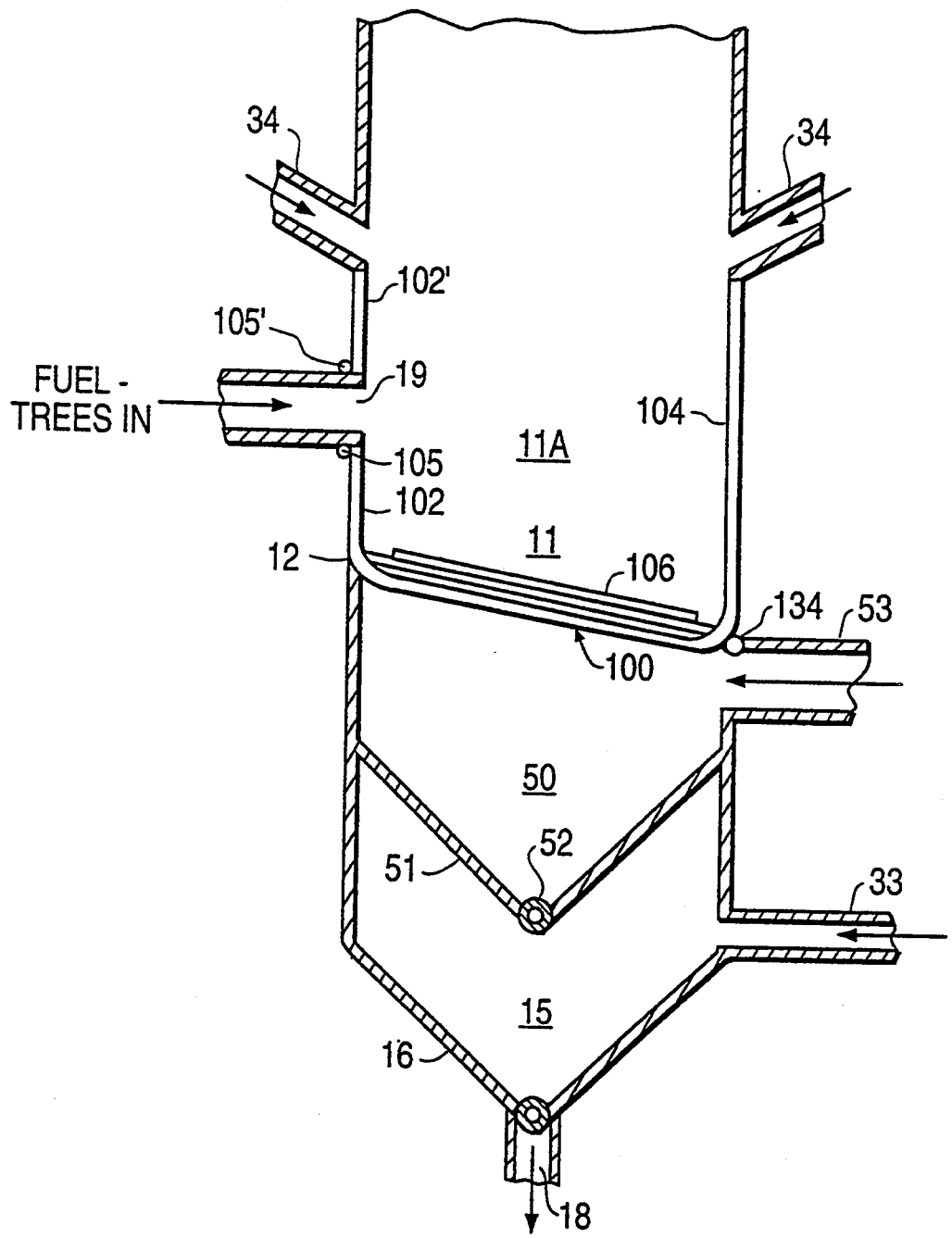
FIG. 12 is a schematic drawing illustrating a combustion chamber according to a fourth preferred embodiment.

FIG. 12 shows a fourth preferred embodiment of the whole tree burning system. Elements similar to those in FIGS. 2–11 have been given the same reference numerals. This preferred embodiment is similar to that of FIG. 10 in that the stacked cooling grate 100 is modified to have a slight downward slope away from the fuel charge opening 19. Additionally, the whole tree burning system according to FIG. 12 is provided with a four-stage combustion chamber design. In particular, intermediate combustion stage 50 is added between stage 11 and combustion stage 15. The water circuit for the embodiment of FIG. 12 would be similar to that shown in FIG. 11.

Figure 13:
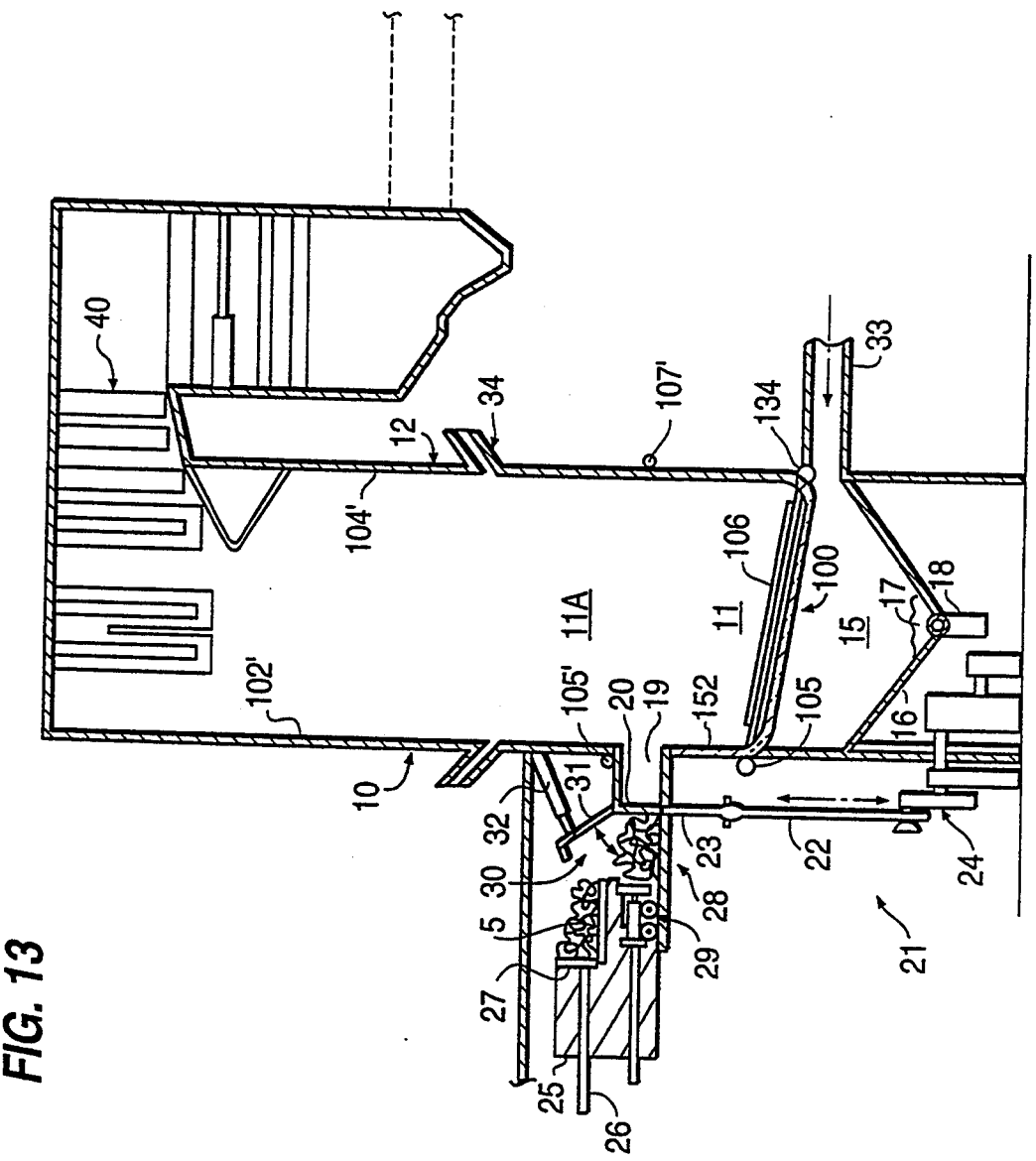
FIG. 13 is a cross-sectional and schematic drawing illustrating a furnace, boiler, fuel delivery equipment and water circulation according to a fifth preferred embodiment.
Figure 14:
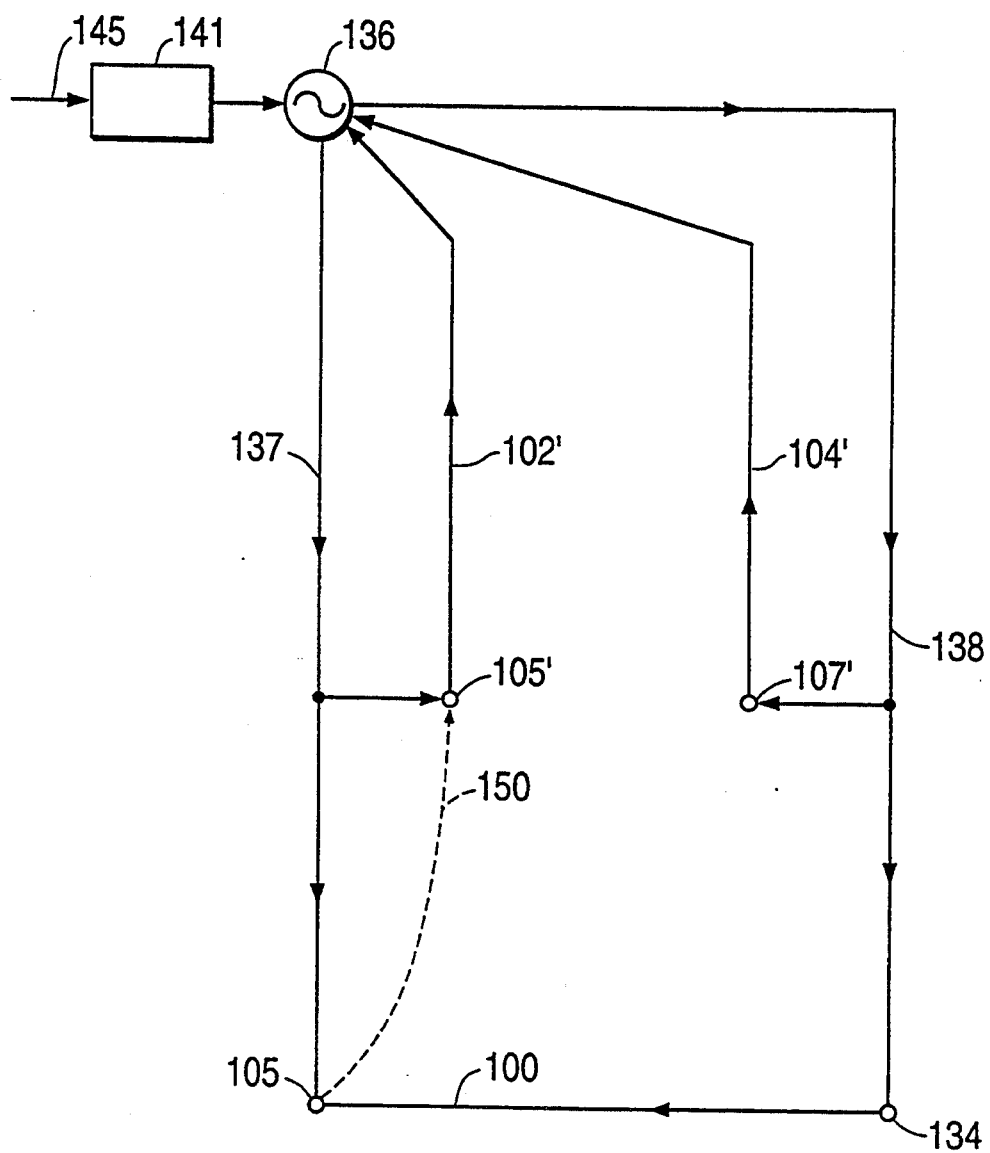
FIG. 14 is a water circuit diagram of the circulation of water in the furnace, boiler and fuel delivery equipment of FIG. 13.

FIG. 13 illustrates a fifth preferred embodiment of the invention. Elements similar to those in FIGS. 2–12 have been given the same reference numerals. The main distinction between the prior embodiments and the fifth one is that the stacked cooling grate 100 is not integral with the water walls 102 and 104. The sides of the furnace wall under the charge opening 19 are lined with refractory insulating walls 152 and 153, instead of water walls as in the previous embodiments. Reference is made to FIG. 14 which is a simplified water circuit diagram for this preferred embodiment. The water for cooling grate 100 is supplied to the tubes of the support beams 106 through mud drum 134 at the right side of the grate, and through injection header 105 at the lower left side of the grate. The mud drum 134 and injection header 105 are supplied by down comers 138 and 137, respectively, from the drum 136. The water then travels through the mud drum 134 through support beams 106 across the width of the furnace to header 105 on the left side. A connecting pipe 150, which cannot be shown in FIG. 13, then carries water from the injection header 105 up to the upper injection header 105'. The injection header 107' on the right side is supplied by down comer pipe 138. The headers 105' and 107' are connected to a bank of tubes to form upper water walls 102' and 104' as previously set forth. In this way the stacked cooling grate 100 is separated from the water walls 102' and 104' in a physical sense but the tubes of the stacked cooling grate are maintained in fluid communication. This type of installation may be advantageous for retrofitting existing power plants. Conversion of an existing power plant to a whole tree burning one can be achieved by retrofitting the power plant in the manner provided. The exact configuration of the grate, water walls and headers would depend on several factors including cost, old plant layout, feasibility of design changes, etc.

Figure 15:
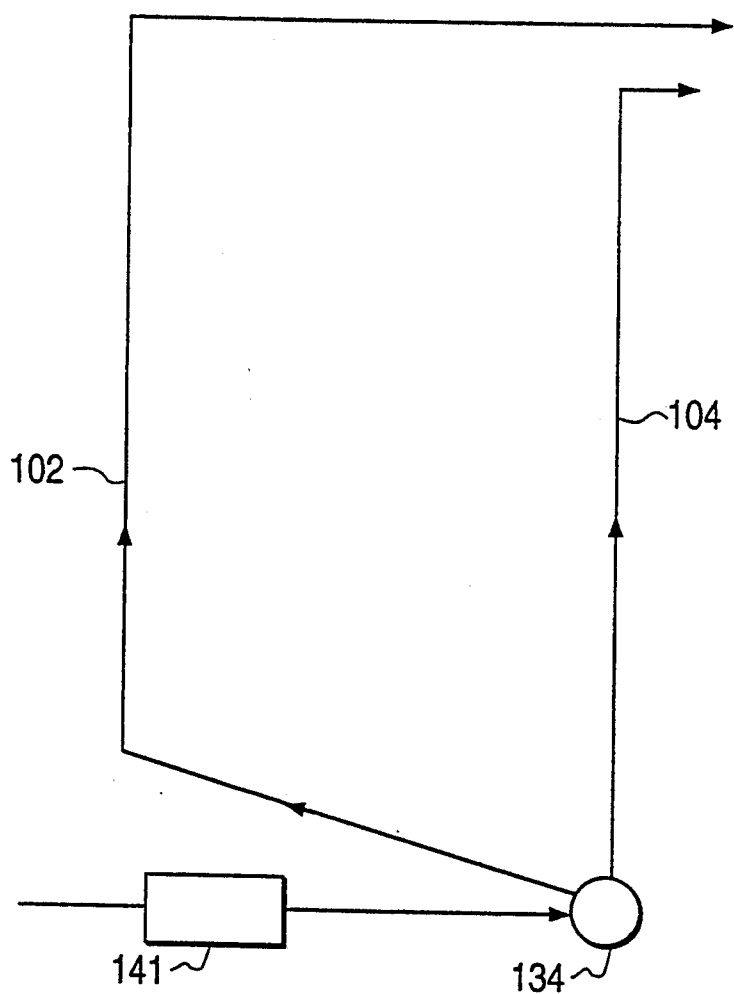
FIG. 15 is a water circuit diagram of a once-through super-critical universal pressure system showing another possible design.

FIG. 15 is a simplified circuit diagram of a once-through universal pressure system. The system of the present invention may be equipped with this type of water/steam circuit which is another possible design of the water/steam circuit.

The whole tree burning power plant reduces fuel cost significantly compared with a conventional processed wood burning power plant, because the present invention eliminates the necessity of processing wood as required in the conventional plant. If the plant of the present invention is situated in a location where long distance transportation of whole trees is not necessary, fuel cost can be reduced to less than a half of the conventional processed wood burning plant. In addition, the substantially whole trees of the present invention do not have to be supplied to the furnace at a precisely metered rate, such as processed wood. Rather, a bed of burning substantially whole trees supplies a steady, constant supply of gas and this gas supply can be readily controlled by controlling the temperature of the tree bed combustion so that the trees can be supplied periodically in batches. Also, the larger or higher the bed of trees is made, the lower the temperature at which the bed can be burnt to supply sufficient gas.

The whole tree burning system of the present invention is also economical in comparison to a coal burning power plant. Because a wood bunting power plant virtually eliminates sulfur dioxide emissions typical of fossil power generation, it requires much less plant capital costs and operating costs. Typical flue gas scrubbing equipment, indispensable for a coal burning plant, are not required in a whole tree bunting system.

Due to the savings in fuel cost in combination with less capital and operating costs of wood burning plant compared with coal burning power plant, the whole tree power plant would be a most cost effective alternative.

Naturally, it should be understood that changes can be made to the disclosed embodiment. Thus, it will be obvious to one of ordinary skill in the art that numerous modifications may be made without departing from the true spirit and scope of the invention, which is to be limited only by the appended claims.

I claim:

1. A device for suspending fuel in a furnace of an electrical generating plant comprising:
   a plurality of tubes defining a first tube bank;
   a plurality of tubes defining a second tube bank;
   a support means between said first and second tube banks for supporting said fuel, wherein each of said tubes in said first tube bank in fluid communication with a corresponding tube in said second tube bank, said support means bridging the fluid communication between corresponding tubes in said first tube bank and said second tube bank;
   said support means comprising a plurality of water cooled beams, at least some of said beams being formed by stacking an upper tube and at least one lower tube vertically beneath said upper tube, wherein said upper tube is one of said tubes of said first tube bank, and said lower tube is one of said tubes of said second tube bank; and
   means for supplying water to said first tube bank, said second tube bank and said water cooled beams of said support means such that said tubes of said tube banks and said water cooled beams are cooled by the circulation of water therethrough.

2. The device recited in claim 1, wherein said tubes of said first tube bank are bent to form one end of said support means and said tubes of said second tube bank are bent to form another end of said support means.

3. The device recited in claim 2, wherein said first tube bank is arranged substantially in a first plane.

4. The device recited in claim 3, wherein said second tube bank is arranged substantially in a second plane.

5. The device recited in claim 4, wherein said first tube bank and said second tube bank are parallel and said support means is sloped downwardly towards said second tube bank.

6. The device cited in claim 4, wherein said first tube bank and said second tube bank are parallel and said tube banks are substantially perpendicular to said support means.

7. The device recited in claim 1, wherein gaps are present between said beams of said support means.

8. The device recited in claim 1, wherein each of said beams of said support means is comprised of a stack of at least three vertically aligned tubes.

9. The device recited in claim 1, further comprising a wear bar welded to the tops of the upper tubes of said beams of said support means for strengthening said support means and providing a wear surface.

10. The device recited in claim 1, wherein said means for supplying water comprises means for introducing water from a steam drum to a mud drum, said mud drum located at the intersection of said water cooled beams and said second tube bank, wherein said mud drum directs water through said water cooled beams and into said first tube bank and said mud drum also direct water through said second tube bank.

11. A device for suspending fuel in a furnace of an electrical generating plant comprising:
   a support means for supporting said fuel, said support means comprised of a plurality of water cooled beams, at least some of said beams being formed by stacking an upper robe with at least one lower robe vertically beneath said upper tube; and
   means for supplying water to said water cooled beams of said support means such that said water cooled beams am cooled by circulation of water therethrough.

12. The device recited in claim 11, wherein said support means is sloped downwardly.

13. The device recited in claim 11, wherein gaps are present between said beams.

14. The device recited in claim 11, wherein said beams is comprised of a stack of at least three vertically aligned tubes.

15. The device recited in claim 11, further comprising:
   a plurality of tubes defining a first tube bank spaced above one side of said support means;
   a plurality of tubes defining a second robe bank spaced above the other side of said support means;
   wherein said first tube bank is in fluid communication with said water cooled beams of said support means and said second tube bank is in fluid communication with said water cooled beams of said support means.

16. The device recited in claim 11, further comprising a wear bar welded to the tops of the upper tubes of said support means for strengthening said support means and providing a wear surface.

17. A system for providing power to an electrical generating power plant comprising:
   means for defining a combustion chamber within which substantially whole trees are burned;
   conveyor means for delivering said substantially whole trees for combustion into said combustion chamber;
   injection means for injecting said substantially whole trees from said conveyor means into said combustion chamber;
   heat absorbing means for absorbing the heat of combustion of said substantially whole trees, said heat absorbing means being adapted to be operatively connected to means for converting the absorbed heat into electrical power; and
   means for suspending said substantially whole trees in said combustion chamber during combustion, said suspending means comprising;
   a plurality of tubes defining a first tube bank,
   a plurality of tubes defining a second tube bank,
   a support means between said first and second tube banks for supporting said fuel, wherein each of said tubes in said first tube bank in fluid communication with a corresponding tube in said second tube bank, said support means bridging the fluid communication between corresponding tubes in said first tube bank and said second tube bank,
   said support means comprising a plurality of water cooled beams, at least some of said beams being formed by stacking an upper tube and at least one lower tube vertically beneath said upper tube, wherein said upper tube is one of said tubes of said first tube bank, and said lower tube is one of said tubes of said second tube bank, and
   means for supplying water to said first tube bank, said second tube bank and said water cooled beams of said support means such that said tubes of said tube banks and said water cooled beams are cooled by the circulation of water therein.

18. A system for providing power to an electrical generating power plant comprising:
   means for defining a combustion chamber within which substantially whole trees are burned;

conveyor means for delivering said substantially whole trees for combustion into said combustion chamber;

injection means for injecting said substantially whole trees from said conveyor means into said combustion chamber;

heat absorbing means for absorbing the heat of combustion of said substantially whole trees, said heat absorbing means being adapted to be operatively connected to means for converting the absorbed heat into electrical power; and means for suspending said substantially whole trees in said combustion chamber during combustion, said suspending means comprising;

a support means for supporting said fuel, said support means comprising a plurality of water cooled beams, at least some of said beams being formed by stacking an upper tube and at least one lower tube vertically beneath said upper tube, wherein said upper tube is one of said tubes of said first tube bank, and said lower tube is one of said tubes of said second tube bank, and means for supplying water to said water cooled beams of said support means such that said water cooled beams are cooled by the circulation of water therein.

19. A method for providing thermal power to generate electricity in a power plant comprising:

delivering substantially uncut and untrimmed whole trees to a combustion chamber;

forming a bed of said substantially whole trees on a stacked cooling grate in said combustion chamber;

burning said bed of said substantially whole trees during a first combustion stage in said combustion chamber, causing volatile gases in said substantially whole trees to volatilize above said first combustion stage;

burning said volatile gases during a second combustion stage in an area above said bed of said substantially whole trees, said second combustion stage occurring at a higher temperature than the average temperature of said first combustion stage;

burning any char from said first combustion stage during a third combustion stage in an area under said bed of substantially whole trees;

controlling the temperature of combustion of said substantially whole trees;

controlling the flow rate of air below the burning trees;

absorbing the heat of combustion in boiler sections of a power steam generator located above said combustion chamber; and circulating water through said stacked cooling grate to cool said grate during combustion.

* * * * *